United States Patent [19]

Wakefield

[11] Patent Number: 4,648,056

[45] Date of Patent: Mar. 3, 1987

[54] FLOATING TARE ADJUSTMENT FOR CONTINUOUS CONVEYOR WEIGHING SYSTEMS

[75] Inventor: James R. Wakefield, Rocky River, Ohio

[73] Assignee: Hall Systems, Inc., Westlake, Ohio

[21] Appl. No.: 627,962

[22] Filed: Jul. 5, 1984

[51] Int. Cl.⁴ .................. G01G 19/04; G06F 15/46
[52] U.S. Cl. .................................. 364/567; 177/3;
177/25; 364/471; 364/571; 364/575
[58] Field of Search .......... 177/3, 25, 1, 50, DIG. 12;
364/466, 469, 471, 550, 567, 568, 571, 575

[56] References Cited

U.S. PATENT DOCUMENTS

| 4,063,604 | 12/1977 | Rock ................................. 364/567 |
| 4,157,738 | 6/1979 | Nishiguchi et al. .................... 177/1 |
| 4,368,790 | 1/1983 | Ives ................................... 364/567 |
| 4,425,974 | 1/1984 | Kipp .................................. 177/25 |

Primary Examiner—Parshotam S. Lall
Assistant Examiner—Kevin J. Teska
Attorney, Agent, or Firm—Fay, Sharpe, Fagan, Minnich & McKee

[57] ABSTRACT

A conveyor (10) conveys stacks of newspapers to a weigh station (A). The weigh station produces a digital weight signal which is processed by an electric circuit (B) to determine whether each bundle contains a preselected number of newspapers. A display (F) provides an indication whether or not the weighed bundle contains the preselected number of newspapers. More specifically, the electronic circuit includes a microprocessor (22) which is programmed to store a preselected number of acceptable bundle weights in a tare calculation memory (72). An algorithm implementing routine (78) averages the stored weights to determine an average weight or tare. A subtraction circuit or routine (52) subtractively combines the tare and the measured weight. A divider circuit or routine (56') divides the tare by twice the number of newspapers which are to be in each bundle to determine the weight of half a paper. A comparing circuit or routine (54) compares the weight difference signal with the weight of half an article to determine whether or not each measured bundle contains the proper number of papers. If the bundle contains the proper number of papers, the measured bundle weight replaces the least recently stored weight in the tare calculation memory and a new tare is determined. In this manner, the tare is readjusted after every acceptable bundle is weighed such that the tare is a function only of the weight of precedingly accepted bundles and may fluctuate widely with variations in the density of ink, paper, and the like.

18 Claims, 5 Drawing Figures

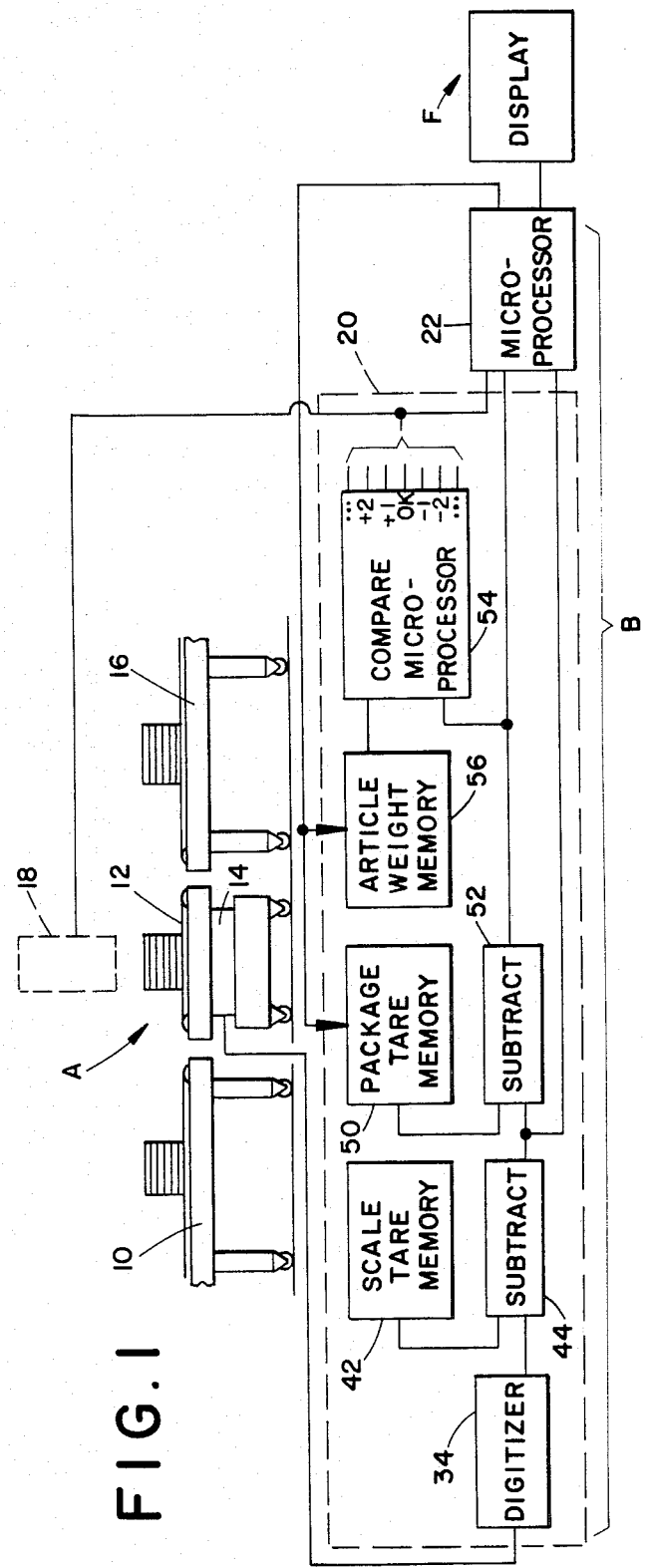
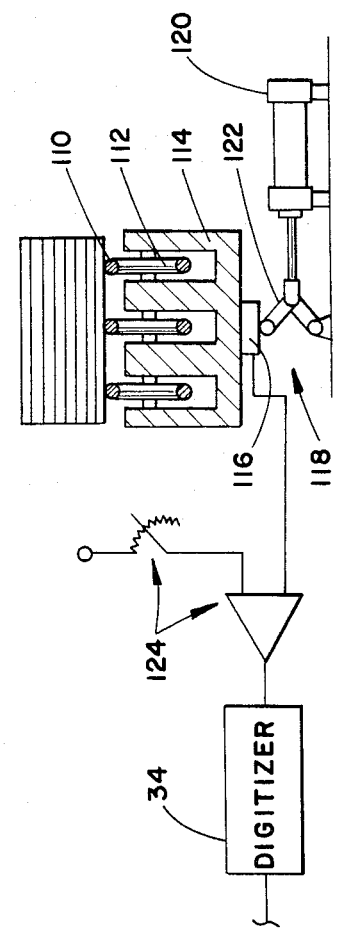
FIG. 1
FIG. 3

FLOATING TARE ADJUSTMENT FOR CONTINUOUS CONVEYOR WEIGHING SYSTEMS

BACKGROUND OF THE INVENTION

The present invention pertains to the art of weight verification. It finds particular application in weight checking packages, such as bundles of newspapers, to determine whether each bundle contains a preselected number of articles or newspapers. It is to be appreciated, however, that the invention finds utility in other applications in which weight is used to check the number of articles in a package, in which the article count of printed material bundles or packages is verified, and other applications in which the average weight of the articles may fluctuate.

Heretofore, it was proposed to weigh bundles of newspapers to determine the number of papers in each bundle. To set the tare, the typical weight of an individual newspaper was determined and multiplied by the number of newspapers per bundle, e.g., 25. The measured weight of each bundle was compared with the set tare. If the measured bundle weight was within a preselected tolerance, normally plus or minus half the typical individual newspaper weight, of the set tare, the bundle was considered acceptable. If the bundle was above or below the preselected tare by greater than this preselected tolerance, the bundle was considered to have too many or too few newspapers, respectively, When weighing bundles of 25 articles, a uniform weight variation of only 2% in the typical individual article weight results in a bundle weight variation of 50% of the typical individual article weight, i.e., the normal tolerance. Thus, small, consistant weight variations in the weight of packaged articles cause errors in the article count per bundle.

In newspaper production, it has been found that newspapers typically vary in weight over significantly more than a 2% range. One cause of the weight change is the weight of the newspaper stock. The paper stock may vary in thickness, moisture content, and other characteristics which affect its average weight per unit area. A more pronounced variation in the newspaper weight is caused by variations in the moisture content of the ink. In an off-set printing process, the water content of the ink and other properties of the ink will fluctuate during a printing run. These changes tend to occur cyclically over large numbers of newspapers as ink vats are refilled, paper rolls changed, and the like.

The present invention contemplates a new and improved method and apparatus for weight measuring the number of articles in a package or bundle which overcomes the above-referenced problems and others.

SUMMARY OF THE INVENTION

In accordance with a first aspect of the present invention, there is provided a method of checking packages for acceptability in which acceptability is determined from the checked packages themselves without preselected standards. The measured weight of each package to be checked is compared with a preselected function, such as the average, of the weight of a preselected number of precedingly weighed acceptable packages, rather than a preselected fixed tare. The weight of each acceptable package is factored into the average weight prior to comparison with subsequently measured packages. In this manner, the average weight changes after each acceptable comparison and is not pegged to a preselected tare weight.

In accordance with a more limited aspect, a number of acceptable package weights are averaged to determine an average acceptable package weight. The weight of a first subsequent package is measured to determine a measured package weight. The measured subsequent package weight is compared with the average acceptable package weight to check whether the measured package weight is acceptably close to the average package weight. If the measured packaged weight is acceptably close to the average package weight, the least recently measured one of the preselected number of acceptable package weights is replaced with the measured package weight and the average package weight is redetermined. Additional package weights are measured and compared. The average package weight is redetermined after each acceptable measured package weight. In this manner, the acceptability of each package is judged based upon the continuously changing average weight of precedingly weighed packages without regard to a theoretical fixed or limitly adjustable tare.

In accordane with a still more limited aspect of the invention, each package is a bundle of newspapers. The averaging step includes averaging the six precedingly weighed acceptable bundle weights to determine the average bundle weight. The comparing step includes comparing the difference between the measured and average bundle weight to determine whether the difference is within half of the average bundle weight divided by the number of newspapers in an acceptable bundle.

In accordance with another aspect of the invention, there is provided an apparatus for checking the acceptability of packages. The apparatus includes a weighing means for weighing each of a plurality of packages fed thereto to determine a measured package weight. A tare calculation means stores a preselected number of the most recently weighed package weights. A comparing means compares each measured package weight with a predetermined function of the stored package weights to determine whether the measured package weight is within an acceptable tolerance thereof. In response to the measured package weight being acceptably close to the stored package weight function, a memory control replaces the least recently measured package weight in the tare calculation memory with the just measured acceptable package weight.

In accordance with a more limited aspect of the invention, the apparatus weighs bundles of newspapers to determine whether each bundle contains a predetermined number of newspapers. The apparatus further includes an averaging means for averaging the preselected number of stored package weights. The comparing means compares each measured package weight with the average package weight to determine whether each newspaper bundle is within plus or minus half the weight of one newspaper of the average package weight.

A primary advantage of the present invention is that the tare against which each package is compared varies continuously and is readjusted after every acceptable package is weighed.

Another advantage of the present invention is that the tare can vary, without constraint, over wide ranges with cyclic variations in the weight of the articles within each package.

Yet another advantage of the present invention is that it accurately measures the number of newspapers in bundles, even as the newspapers vary significantly in weight.

Still further advantages of the present invention will become apparent to others upon reading and understanding the following detailed description of the preferred embodiments.

BRIEF DESCRIPTION OF THE DRAWINGS

The invention may take form in various parts and arrangements of parts and in various steps and arrangements of steps. The drawings are only for purposes of illustrating preferred embodiments of the drawings and are not to be construed as limiting it.

FIG. 1 is a diagrammatic view of a conveying system in conjunction with the present invention;

FIG. 3 illustrates an alternate embodiment of a weight station for use in conjunction with the present invention; and, FIG. 4 is a schematic diagram of a hard wired circuit in accordance with the present invention.

DETAILED DESCRIPTION OF THE PREFERRED EMBODIMENTS

With reference to FIG. 1, a plurality of packages, such as bundles of newspapers, are conveyed to a weigh station A to be checked to determine whether each package includes a preselected number of articles. The weigh station provides a digital signal indicative of the weight of each bundle or package to an electronic processing circuit B. From the weight of previously acceptable packages having the preselected article count, the processing circuit determines whether the currently weighed package is acceptable.

Figure 2A:
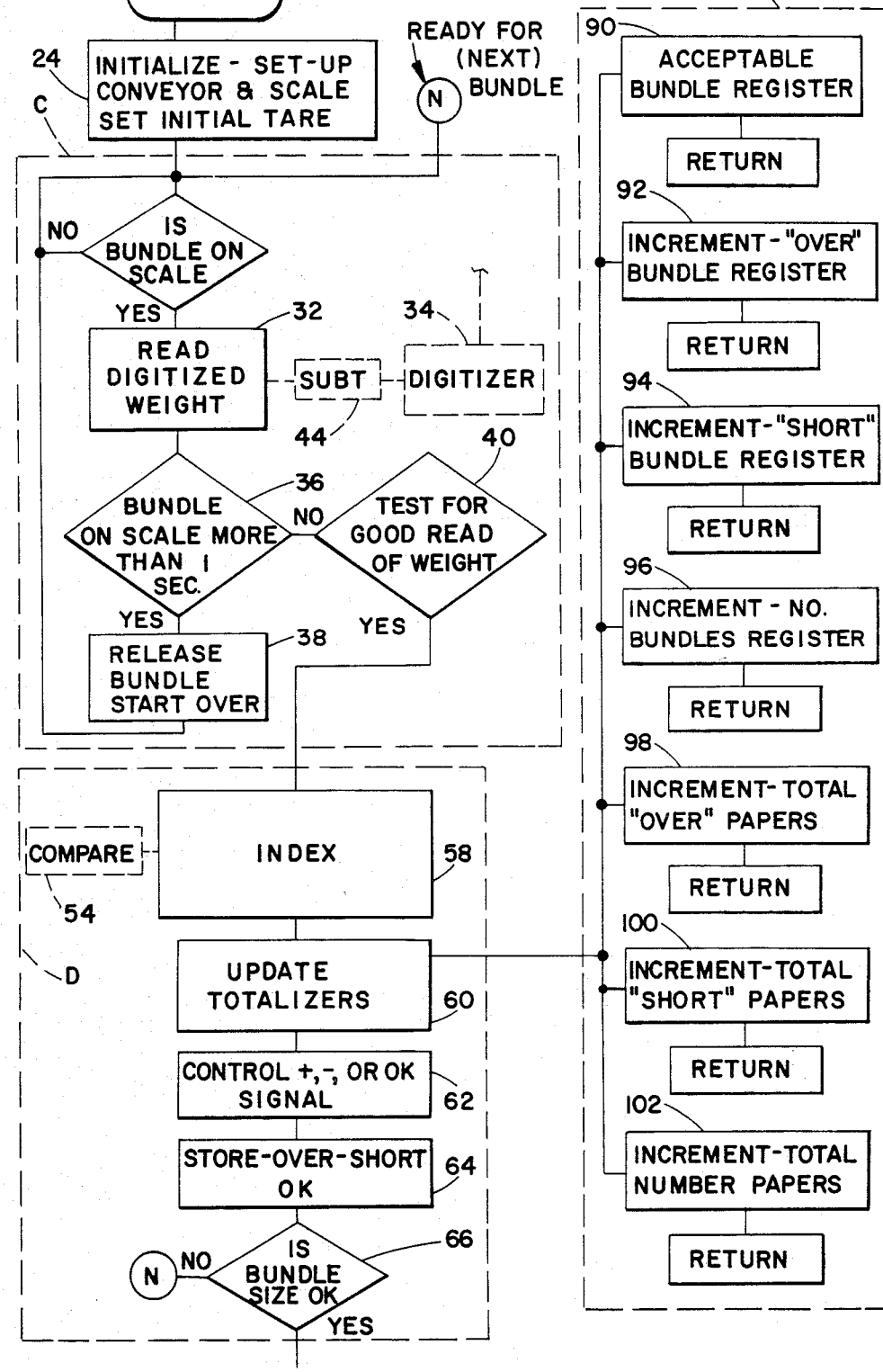
FIGS. 2A and 2B are a two-part representation of a computer programmer's logic diagram for programming the microprocessor of FIG. 1 in accordance with the present invention.
Figure 2B:
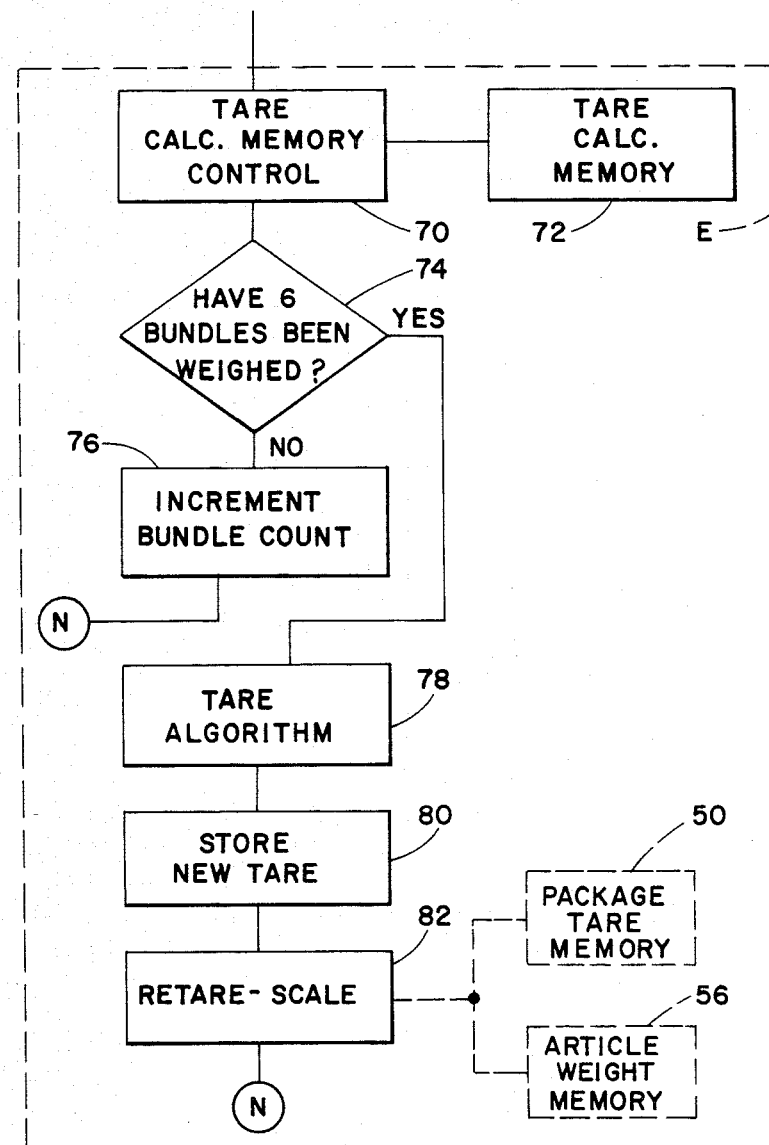

With particular reference to FIGS. 2A and 2B, the electronic processing circuitry includes means C for determining the measured weight of each weighed package or bundle. A comparing means D compares the measured weight with a package tare weight. The variance between the measured and package tare weights is indicative of whether the weighed package is acceptable. A package tare weight calculating means E recalculates the tare weight as a function of the precedingly measured package weights. A display means F provides an appropriate display of operator-important information, such as whether the measured package is acceptable, total numbers of acceptable or unacceptable packages, and the like.

Referring again to FIG. 1, a conveyor 10 such as continuous belt conveyor conveys packages such as bundles of stacked newspapers to the weigh station A. The weigh station includes a belt conveyor 12 which is mounted on a load cell 14. The speed and length of the weigh station belt conveyor 12 is selected such that the package is supported by the load cell for a sufficient duration to make an accurate weight measurement. Although the exact duration will vary with the damping characterics of the load cell, it is preferred that the package weight be measured in less than a second. A downstream conveyor 16 conveys at least the acceptable packages to appropriate downstream processing equipment such as bailing and wrapping machinery.

Optionally, a package-size adjusting means 18 may be disposed in conjunction with the weigh station and operated under control of the electronic circuit B to adjust the package weight automatically. Specifically, if the electronic circuitry determines that the bundle of newspapers is short, the electronic circuitry causes the weight adjusting means 18 to supply the appropriate number of additional newspapers. Analogously, the package adjusting means removes extra newspapers from each stack, if the bundle is overweight. Alternately, the electronic circuit may signal if the bundle is short or over and the number of newspapers in each bundle may be adjusted manually. As yet another option, a computer which controls the overall printing, bundling, and distributing operation may keep track of the bundles which have too many or too few papers and make the appropriate corrections downstream. For example, bundles which are a newspaper short may be matched with bundles with an extra newspaper such that the appropriate number of newspapers is distributed to each location.

In the preferred embodiment, the electronic circuitry B is embodied, in part, in a weigh station circuit or processor 20 and, in part, in a remote computer or central processor 22. This facilitates integrating several weigh stations with a common processor. The present invention contemplates that the functions performed by the weigh station circuitry and the processor may be divided differently between them or all performed by either one.

With reference to FIGS. 2A and 2B, an initializing means or routine 24 initializes the central processor 22. The initializing means sets totallizers and pertinent data reference points to zero or other specified levels, sets operating parameters of the conveyor, calibrates the weigh station A, receives appropriate operator input, such as the number of newspapers per bundle, and the like.

With continuing reference to FIGS. 2A and 2B and further reference to FIG. 1, regarding the weight determining means or program C, a package or bundle presence determining program or means 30 monitors whether a bundle is on the scale. The bundle presence monitoring means may include a photodiode or the like, or may monitor the weight output of the load cell to determine the presence of a package on the scale. If no package is on the scale, the program recirculates looking for the receipt of a package. If a package is on the scale, the weight reading program or means 32 causes a digitizer 34 in the weigh station to digitize the weight signal from the load cell and reads the digital weight.

A timing means or program 36 measures whether a package has been on the scale for more than a second. If the bundle has been on the scale for more than a second, a release subroutine or means 38 causes the weigh station belt conveyor 12 to release the package and move on to the next package. The program returns to the bundle presence determining routine 30 to monitor for the presence of another package or bundle. Concurrently, a test routine or means 40 tests for a valid or steady state reading of the weight. When a bundle is first placed on the weight station, the weight fluctuates until the damping of the scale brings the weight to a steady state value. The test routine takes multiple weight readings from the digitizer and compares them to each other until a preselected number of weight readings, e.g., 3, are taken in succession which are within a preselected narrow range. This assures that the scale has stopped oscillating and a valid weight reading has been taken.

With particular reference to FIG. 1, the electronic circuitry B at the weigh station includes a scale tare adjusting circuit which adjusts the weight signal for the weight of the weigh station conveyor 12 and other mechanical components supported by the load cell. For example, a manually adjustable, digital scale tare memory 42 provides a signal which compensates for the weight of the load cell supported mechanical components. A digital subtraction circuit 44 subtractively combines the digitized weight signal with the scale tare signal. In this manner, the reading routine 32 reads the package weight. Optionally, compensation may be made for the scale tare in the processor 22 or in an analog adjustment between the load cell and the digitizer.

With continuous reference to FIGS. 1, 2A and 2B, the comparing means D compares the digital measured package weight with a calculated package tare, the calculation of which is discussed below. The comparing means incudes a calculated package tare memory 50 and a package tare subtraction means 52 for subtractively combining the measured weight and the tare.

A comparing means 54 determines whether the difference between the measured weight and the tare is within plus or minus half the average weight of articles in the package as read from an article weight memory 56. For example, when the packages are bundles of 25 newspapers, the weight of the average article or newspaper is 1/25th of the tare. If the weight difference is within half an article weight, then the bundle is acceptable. If the bundle is over or under by more than half an article weight, the comparing means determines the number of article weights over or under, i.e., the number of papers extra or short in the bundle. In the preferred embodiment, the comparing means 54 is a part of a weigh station microprocessor which further calculates how many articles a package is over or under.

An index means or routine 58 receives and calculates measured weight and weight difference information, such as the gross weight, the net weight, the number or count of articles or papers in the package or bundle, the number short, the number over, average article weight, and the like. A totallizer or counter updating means or program 60 selectively updates or increments various registers and counters of the below-discussed display means F, such as registers and counters indicative of the number of bundles weighed, the total number of newspapers, and the like.

A peripheral equipment control means or routine 62 produces an output signal indicating whether the package has too many articles, too few, or is acceptable. This signal controls appropriate lights to tell the operator whether papers need be added or removed from the bundle, controls automatic equipment for correcting bundles which include too many or too few papers, or the like. A register means 64 stores the over, short, or acceptable information. A package or bundle size means or routine 66 determines whether the bundle or package is of the proper size. If it is not, the program returns to the package presence monitoring routine 30 to await the next bundle or package. If the package is of the appropriate size, it initiates the tare calculation program or means E.

The tare calculation means E includes a tare weight calculation memory control routine or means 70 which controls retention of the weights of acceptable measured bundles or packages in a tare calculation memory 72. More particular to the preferred embodiment, the tare calculation memory control means 70 causes the preceding six acceptable measured package weights to be stored. Each time a new acceptable weight is received from the size routine 66, the least recently stored or oldest measured weight is dropped from the tare calculation memory and replaced with the most recent measured acceptable package weight. In this manner, the tare calcuation memory retains the six most recently measured package weights. Although other numbers of measured package weights may be stored as appropriate to the packages weighed, the use of the preceding six measured package weights has been found to be advantageous in measuring bundles of varying sizes. It has been found that utilizing five or fewer and seven or more preceding measured weights is less accurate in determining the number of newspapers in each bundle.

A tare initializing routine or means 74 determines whether or not at least a preselected number of acceptable packags, e.g., six acceptable bundles, have been weighed since the program was initialized. In the preferred embodiment, a first acceptable bundle is weighed and used to set an initial value of the tare. As succeeding bundles are weighed, each is compared with the set tare. If the bundle is determined to be acceptable, its weight is stored in the tare calculation memory 72. If fewer than the preselected number of weight measurements have been stored in the tare calculation memory, a package count increment means or routine 76 increments the package or bundle count and the program returns to the package presence determining routine to read the next package weight.

If the tare calculation memory 72 is full, i.e., the tare memory has been initialized, then a tare algorithm routine or means 78 receives the measured weights stored in the tare calculation memory 72 and performs a preselected mathmatical algorithm thereon. More specific to the preferred embodiment, the tare algorithm 78 adds the six measured weights stored in the tare calculation memory and divides the sum by six to find the average thereof. The average of the immediately preceding six acceptable measured package weights becomes the tare against which the next package is compared. In this way, the running average of the most recently measured acceptable package weights is updated after every acceptable measurement. The tare varies or floats as a function of the weights of the precedingly weighed acceptable packages, without constraint. Other algorithms may also be implemented. For example, a weighted averaging of a preselected number of preceding measured weights may be utilized. The more recently weighed acceptable packages may be weighted more heavily during the averaging then the less recently weighed packages. As yet another option, the algorthim means may perform a weighted averaging of the most recently measured weight and the old tare.

A tare storage routine or means 80 stores the calculated new tare. A retare routine or means 82 reprograms the package tare memory 50 at the weigh station with the new tare, reprograms the article memory 56 with the appropriate fraction of the new tare, and otherwise readies the weight station and program for the next weight measurement.

With continuing reference to FIG. 2A, the display means F includes an acceptable package count routine and register means 90 for counting and displaying the total number of acceptable packages or bundles. An overweight package count routine and means 92 counts and displays the total number of overweight packages, i.e., bundles which have too many newspapers. An underweight routine and register means 94 counts the total number of underweight packages. A total package routine and register means 96 countes the total number of bundles or packages processed. An extra newspaper routine and register means 98 counts the total number of bundles or packages processed. An extra newspaper routine and register means 98 counts the total number of extra newspapers in the overweight bundles. A short newspaper routine and register means 100 counts the total number of newspapers which the underweight bundles are short. A total newspaper routine and register means 102 counts the total numbers of newspapers processed. Further, the display means includes the overcount, short, or acceptable displays discussed above which alert the operator to overweight and underweight packages contemporaneous with their weighing.

FIG. 3 illustrates an alternate embodiment of the weigh station in which each package or bundle stops and is lifted from the conveying surface while its weight is measured. The weigh station conveying surface includes a plurality of belts 110 which extend between pairs of rollers including rollers 112. A lift platform 114 has arms or projections which extend between the conveying belts to lift the bundle supported thereon. A load cell 116 is disposed between the lift platform 114 and a lifting means 118. In the illustrated embodiment, the lifting means includes a hydraulic cylinder 120 and a mechanical linkage 122 for selectively raising the lift platform such that the load cell 116 alone supports the package or bundle. The load cell and a scale tare adjustment circuit 124 are connected with the digitizer 34 to produce the digital package weight.

Figure 4:
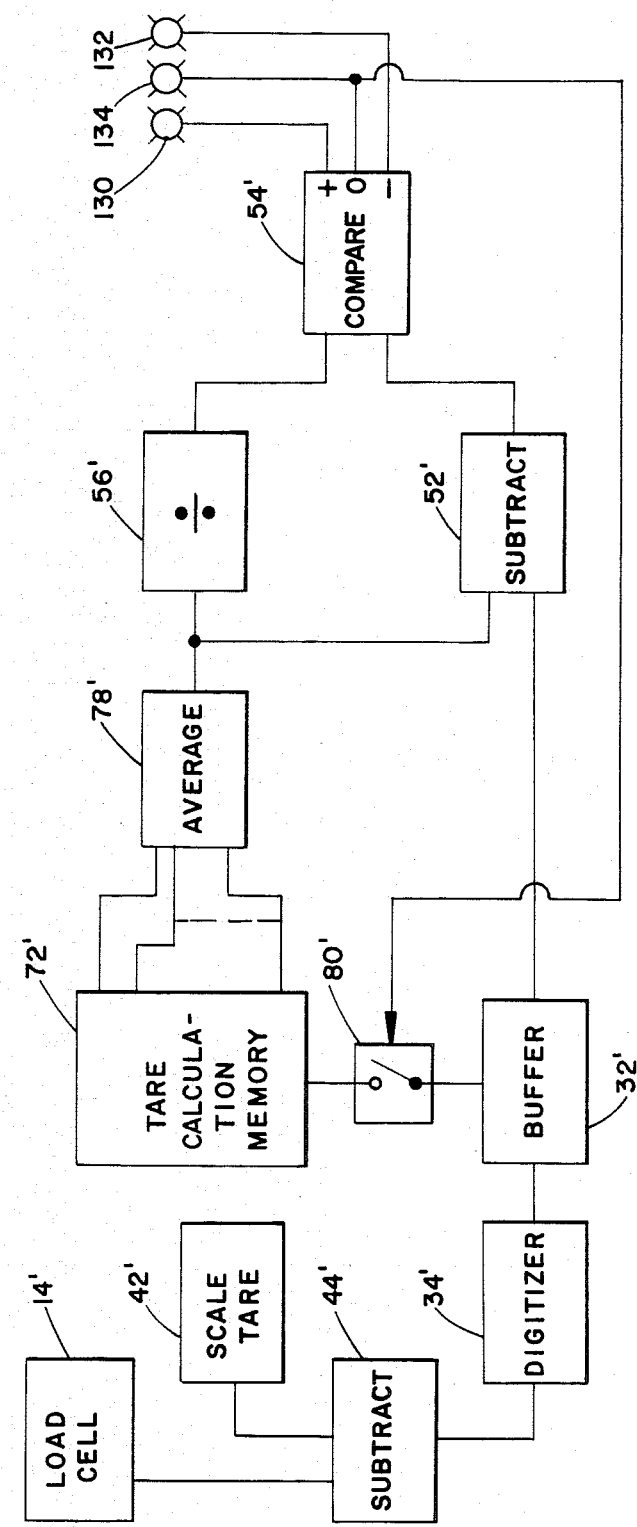

FIG. 4 illustrates an alternate embodiment of the electrical circuit B in which like elements with the embodiment of FIGS. 1, 2A and 2B are denoted by the same reference numeral but followed by a prime ('). At the weigh station, a load cell 14' weighs each package or bundle. A scale tare compensation means 42' and a subtraction means 44' adjust the load cell output to compensate for the weight of the weigh station. A digitizer 34' digitizes the analog weight signal to provide a digital signal representing the measured weight of the bundle which is stored in a buffer memory 32'.

A subtraction means 52' subtracts the measured weight from a precalculated tare based on the weight of preceding acceptable packages from a tare algorithm means 78'. A comparing means 54' compares the difference between the measured and tare weights with a signal indicative of the acceptable range of variance. If the comprising means 54' determines that the package is over by more than the acceptable margin, it illuminates an overweight or overcount indicator lamp 130. If the comparing means determines that the package is short by more than the acceptable margin, then the comparing means illuminates a short or undercount light 132. The over or undercount lights remain illuminated until additional articles are placed in or removed from the package to bring the weight within the acceptable limits. When the weight of the package is within acceptable limits, the comparing means causes an acceptable indicator lamp 134 to be illuminated and causes a tare calculation memory control means 80' to replace the least recently stored weight value in a tare calculation ring memory 72' with the most recently measured weight stored from the buffer 32'. The tare algorithm means 84' operates on the weights stored in the tare calculation memory 72' with a preselected algorithm to determine a new tare based solely on the measured weights of the preceding accepted packages. In the preferred embodiment, the tare calculation memory 72' stores the six most recent measured weights and the tare algorthim means 78' averages these six weights. A divider 56' divides the tare as determined by the tare algorithm means 78' by twice the number of articles which are supposed to be in each package to determine the acceptable range of variance for the comparing means. In this manner, the comparing means 54' determines whether or not the difference between the measured weight and the calculated tare is within plus or minus half the weight of one article.

The invention has been described with reference to the preferred embodiments. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiments, the invention is now claimed to be:

1. A method of checking packages for acceptability, the method comprising:
    (a) measuring a plurality of acceptable package weights;
    (b) storing the measured package weights;
    (c) operating on the stored package weights with a preselected algorithm to determine a tare;
    (d) measuring the weight of a package to be checked for acceptability;
    (e) comparing the measured package weight to be checked with the tare to determine whether the measured package weight is acceptably close to the tare;
    (f) if the measured package weight is acceptably close to the tare, storing the measured package weight from step (e) and operating on the stored package weights from steps (b) and (e) with the preselected algorithm to redetermine the tare;
    (g) measuring additional package weights to be checked and repeating steps (d)–(f) with each additional measured package weight, whereby the acceptability of each package is based upon the measured weight of precedingly weighed packages.

2. The method as set forth in claim 1 wherein the weight storing step includes storing only a preselected number of the most recently stored acceptable package weights.

3. The method as set forth in claim 2 wherein the step of operating on the stored measured weights with a preselected algorithm includes averaging the preselected number of stored package weights.

4. The method as set forth in claim 3 wherein the preselected number of stored package weights is six stored package weights.

5. The method as set forth in claim 4 wherein each acceptable package is a bundle of 25 newspapers.

6. The method as set forth in claim 5 wherein in the comparing step, the difference between the measured weight and the tare is compared with 1/50th the tare to determine whether or not each measured package weight is within ½ a news paper of the 25 newspapers.

7. The method as set forth in claim 1 wherein after the comparing step, if the package is not acceptable, the weight of the package is corrected until it is acceptable.

8. The method as set forth in claim 1 wherein if the measured weight is not acceptable, the package is rejected.

9. A method of determining whether or not a package of articles includes a predetermined number of the articles, the method comprising:
   (a) weighing packages which have the predetermined number of articles to determine acceptable package weights;
   (b) storing a preselected number of acceptable package weights;
   (c) averaging the stored package weights;
   (d) measuring the weight of another package to determine a measured package weight;
   (e) comparing the measured package weight with the average stored package weight to determine whether the measured package weight is within the weight of half an article of the average stored package weight;
   (f) if the measured package weight is within the weight of half an article of the average stored package weight, replacing the least recently stored package weight with the measured package weight and reaveraging the stored package weights to redetermine the average stored package weight;
   (g) measuring additional package weights and repeating steps (e) and (f) with each additional measured package weight.

10. The method as set forth in claim 9 wherein the preselected number of stored package weights is six weights.

11. The method as set forth in claim 9 wherein the packages are bundles of newspapers.

12. An apparatus for checking packages for acceptability, the apparatus comprising:
    weighing means for measuring the weight of each of a plurality of packages conveyed thereto to determine a measured weight of each package;
    memory means for storing a preselected number of measured package weights;
    algorithm means for determining a tare from the stored package weights;
    comparing means for comparing each measured package weight with the tare; and,
    control means entering the measured package weight into the memory means in place of the least recently stored package weight, the control means being connected with the comparing means to be enabled in response to the comparing means determining that the measured package weight is acceptably close to the tare.

13. The apparatus as set forth in claim 12 wherein the algorithm means includes means for determining an average of the stored package weights.

14. The apparatus as set forth in claim 13 further including subtraction means for subtractively combining the tare and the measured package weight to determine a weight difference, and wherein the comparing means compares the weight difference with half the weight of one of the articles to determine whether the weighed package is within half an article weight of the tare.

15. The apparatus as set forth in claim 12 wherein the weighing means includes a load cell for weighing each package and adjustment means for adjusting the output of the load cell to compensate for the weight of package supporting portions of the weighing means.

16. The apparatus as set forth in claim 15 further including a digitizer for digitizing the load cell output to provide a digital representation of measured package weight.

17. The apparatus as set forth in claim 16 further including a subtraction means for subtractively combining the tare from the algorithm means with the digitized weight representation to produce a difference signal.

18. The apparatus as set forth in claim 17 further including divider means for dividing the tare by twice a preselected number of articles which are supposed to be in each package, the divider means and the subtraction means being operatively connected with the comparing means such that the comparing means determines whether each package is within half an article weight of containing the preselected number of articles.

* * * * *